UNITED STATES PATENT OFFICE.

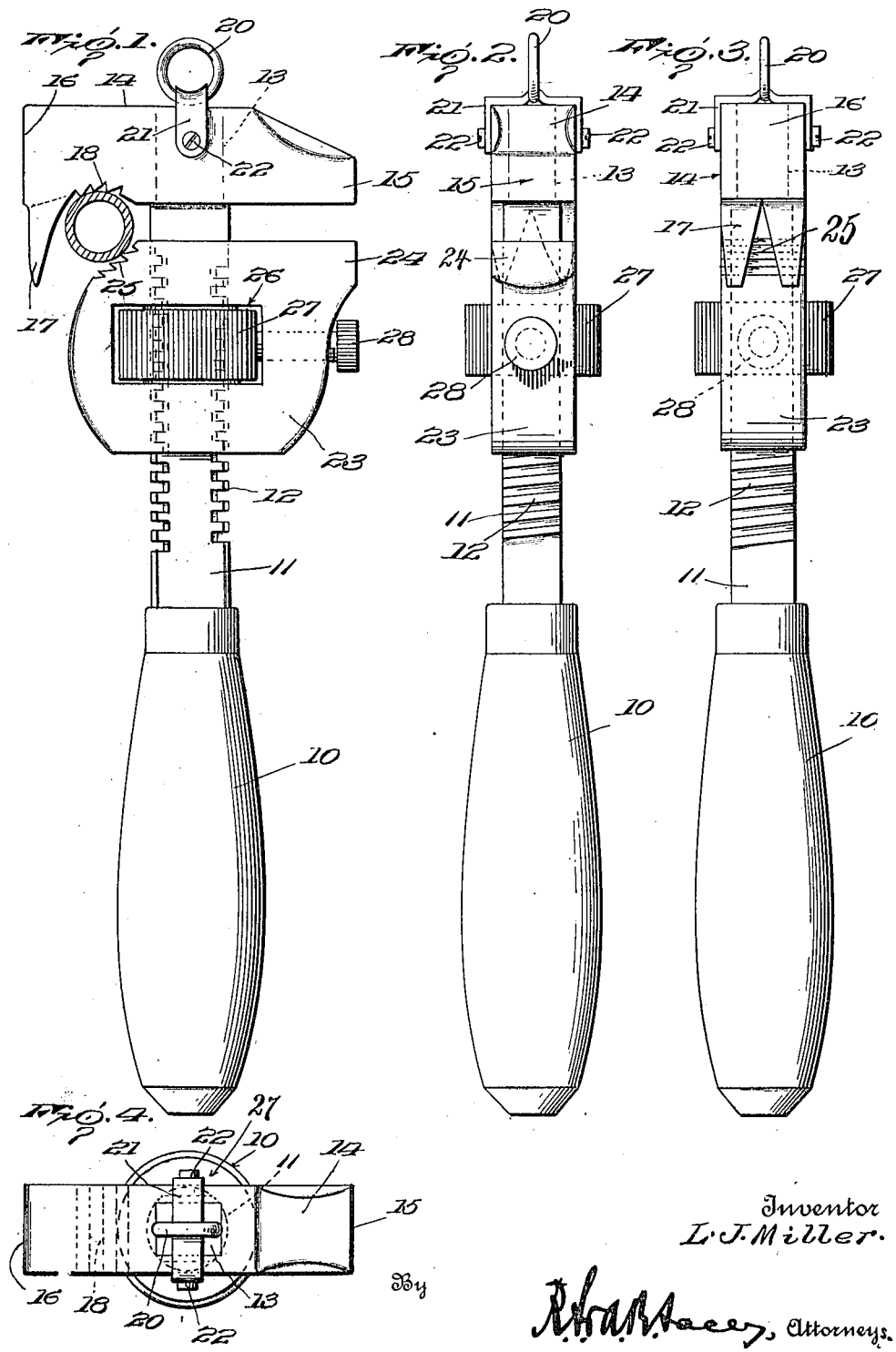

LARKIN J. MILLER, OF UNION STAR, MISSOURI, ASSIGNOR OF ONE-HALF TO JOHN J. MEEK, OF REA, MISSOURI.

WRENCH.

1,280,802.  Specification of Letters Patent.  Patented Oct. 8, 1918.

Application filed June 5, 1917. Serial No. 172,978.

*To all whom it may concern:*

Be it known that I, LARKIN J. MILLER, a citizen of the United States, residing at Union Star, in the county of Dekalb and State of Missouri, have invented certain new and useful Improvements in Wrenches, of which the following is a specification.

This invention relates to improvements in wrenches, and has for one of its objects to provide a device of this character which may be readily adapted without structural change for holding nuts or like devices or for gripping and rotating pipes, rods and the like, thus combining the qualities of a pipe wrench and a nut wrench.

With these and other objects in view, the invention consists in certain novel features of construction, as hereinafter shown and described and then specifically pointed out in the claim; and in the drawings illustrative of the preferred embodiment of the invention—

Figure 1 is a side elevation of the improved device showing its use as a pipe or rod wrench;

Fig. 2 is an elevation viewed from the nut engaging side;

Fig. 3 is an elevation viewed from the pipe or rod engaging side;

Fig. 4 is a plan view.

Corresponding and like parts are referred to in the following description and indicated in all the views of the drawings by the same reference characters.

The improved device comprises a stock including a hand grip portion 10 and a flattened portion 11, the latter having mutilated screw threads 12 in its edges. The flattened portion 11 is reduced at the outer end as illustrated at 13, to enter a corresponding aperture in a head member 14.

The reduced portion 13 is rigidly secured in the head portion 14, preferably by welding.

At one end the head member 14 is extended into a jaw 15 and formed with a hammer face 16 at the opposite end.

A nail pulling claw 17 extends from the hammer face portion of the head, and a recess is formed in the head between the claw portion and the stock, the recess being preferably provided with rod or pipe engaging teeth 18. A suspension eye or ring 20 is coupled to the head 14 by a strap 21, the latter being secured in place by clamp screws 22 fitting in threaded sockets in the head 14. The member 20 provides for the suspension of the implement from the belt of the operator, or for suspending the implement from a nail or other support on a wall. The suspension member 20 may be readily detached if not required, by releasing the clamp screws 22.

Slidably disposed upon the flattened portion 11 of the stock is a sleeve 23 extended at one side of the stock into a jaw 24 adapted to coöperate with the jaw 15 to form a nut receiving recess and with the face of the sleeve at the other side of the stock curving outwardly or concaved, to form a rounded approach to the pipe receiving portion, the object to be hereafter explained.

The corner of the sleeve 23 adjacent to the pipe receiving side of the head 14 is directed obliquely to the longitudinal plane of the stock and provided with teeth 25 which coact with the teeth 18 to grip the pipe or rod. The member 23 is slidable upon the flattened portion of the stock and is provided with a transverse aperture 26 in which a cylindrical nut 27 is received, the nut engaging the teeth 12 of the stock. By this arrangement it will be obvious that by rotating the nut 27 the sleeve 23 may be moved longitudinally of the stock to any required extent within the range of the teeth 12. Thus the jaw portions 15—24 may be adjusted to fit any required size of nut, or to fit varying sizes of rods or pipes at the opposite side by utilizing the teeth 18—25. When the implement is to be employed as a hammer the nut 27 will be rotated to move the sleeve 23 into close proximity to the head 14. When thus arranged the hammer head may be employed for driving nails or the like, while the claw 17 may be employed for withdrawing nails, staples or the like.

The outwardly curving edge of the sleeve 23 coöperates with the guide 17 to form an effectual approach to the entrance to the pipe or rod receiving recess, and enables the implement to be more readily applied and requires no especial care to dispose it in operative position.

Thus in applying the implement it is only necessary to dispose any part of the curved edge of the sleeve against the rod or pipe and move the stock in one direction when the implement will be automatically engaged with the article to be held or turned.

This is an important feature of applicant's device and adds materially to its efficiency and utility.

A set screw 28 is tapped through the sleeve 23 for engagement with the nut 27, to enable the latter to be locked in position upon the stock. Thus no danger exists of the sleeve 23 working loose when in operation.

The improved implement is simple in construction, can be manufactured at small expense and provides a plurality of coacting features whereby various mechanical operations may be performed.

Having thus described the invention, what is claimed as new is:

An implement of the class described comprising a relatively stationary shank having a fixed head, one end of which is provided with a flat surface constituting a hammer face and formed with a depending bifurcated extension constituting a claw, the lower face of the head at its juncture with the claw being concave and serrated to form teeth, a movable jaw slidably mounted on the shank and having its rear end curved in the arc of a circle, and its upper surface provided with a flat face coacting with the adjacent lower face of the head, the curved wall of the movable jaw at its juncture with the flat surface thereof being serrated to form teeth coacting with the teeth of the head, means for adjusting the movable jaw with respect to the head, and means for locking the movable jaw against movement.

In testimony whereof I affix my signature.

LARKIN J. MILLER. [L. S.]

Copies of this patent may be obtained for five cents each, by addressing the "Commissioner of Patents, Washington, D. C."